United States Patent

Hatta et al.

[11] Patent Number: 5,770,837
[45] Date of Patent: Jun. 23, 1998

[54] METAL PLATE FOR ELECTROMAGNETIC HEATING

[75] Inventors: Toshiyuki Hatta; Fumio Matsuyama; Masaya Nishi; Taichiro Nishikawa; Shuzo Nagai; Kenji Miyazaki; Shinji Inazawa, all of Osaka, Japan

[73] Assignee: Sumitomo Electric Industries, Ltd., Osaka, Japan

[21] Appl. No.: 551,074

[22] Filed: Oct. 31, 1995

[30] Foreign Application Priority Data

Nov. 18, 1994 [JP] Japan ................................. 6-284926

[51] Int. Cl.⁶ ........................... H05B 6/12; A47J 27/00
[52] U.S. Cl. .......................... 219/621; 219/634; 126/390; 220/456
[58] Field of Search ................................. 219/621, 620, 219/622, 623, 624, 634, 644, 649; 126/390; 99/DIG. 14; 220/453, 454, 455, 456

[56] References Cited

U.S. PATENT DOCUMENTS

| | | |
|---|---|---|
| 2,269,523 | 1/1942 | Deutsch . |
| 2,473,712 | 6/1949 | Kinney . |
| 2,591,926 | 4/1952 | Gibson et al. . |
| 3,210,840 | 10/1965 | Ulam . |
| 3,684,853 | 8/1972 | Welch et al. ............................. 219/621 |
| 3,966,426 | 6/1976 | Mccoy et al. ............................ 219/621 |
| 4,350,259 | 9/1982 | Cartossi .................................. 220/611 |
| 4,564,001 | 1/1986 | Maeda . |
| 4,614,852 | 9/1986 | Matsushita et al. ..................... 219/621 |
| 4,646,935 | 3/1987 | Ulam ....................................... 219/621 |

FOREIGN PATENT DOCUMENTS

| | | |
|---|---|---|
| 73867 | 6/1975 | Japan . |
| 73868 | 6/1975 | Japan . |
| 112189 | 8/1980 | Japan . |
| 103685 | 5/1986 | Japan . |
| 128180 | 5/1991 | Japan . |

*Primary Examiner*—Philip H. Leung
*Attorney, Agent, or Firm*—Shinjyu Office of Patent Attorneys

[57] ABSTRACT

A metal plate for electromagnetic heating is disclosed which includes a substrate comprising aluminum or aluminum alloys, an intermediate layer formed on at least a portion of one surface of the substrate and comprising zinc or zinc alloys and a conductive layer formed on the intermediate layer for serving as a heat generating body when eddy current induced by high-frequency magnetic flux flows therethrough. Methods of manufacturing a metal plate for electromagnetic heating and a metallic mold for electromagnetic heating are also disclosed.

13 Claims, 2 Drawing Sheets

METAL PLATE FOR ELECTROMAGNETIC HEATING

BACKGROUND OF THE INVENTION

1. Technical Field

The present invention relates to a metal plate for electromagnetic heating, and more particularly to a metal plate for electromagnetic heating which is advantageously employed for receptacles for use in cooking utensils, particularly in cooking utensils of electromagnetic heating type. The present invention also relates to a method of manufacturing the metal plate for electromagnetic heating.

2. Description of Related Art

Conventional receptacles for use in cooking utensils of electromagnetic heating type, such as a bowl placed within a rice cooker, include as substrate thereof a composite plate formed of a magnetic metal plate such as iron or stainless steel which serves to generate heat and an aluminum or aluminum alloy plate which serves to conduct heat, and have been manufactured by subjecting the composite plate to press forming, such as deep drawing, with the latter plate being positioned inside. Generally, the substrate is further provided with fluororesin coating on its inner surface to prevent rice sticking and the others.

Composite plates for the substrate have been heretofore manufactured by a method wherein a magnetic plate and an aluminum or aluminum alloy plate are clad (combined) by roll forming, such as those disclosed in Japanese Kokoku Patent Nos. Sho 54-3468 and Sho 54-9985. As such, the conventional composite plates have been manufactured by means of a cladding method incorporating a roll forming and are accordingly suitable for mass production thereof.

The conventional composite plates, such as those described above, however have a drawback that a wide range of variations in thickness thereof takes place because they are manufactured by means of roll forming and an aluminum or aluminum alloy plate is subjected to press-bonding. This frequently causes a clad plate to crack or wrinkle when it is pressed, and accordingly imposes a serious processing problem. For the conventional composite plates, the magnetic metal plate such as comprising iron or stainless steel for serving to generate heat and the aluminum and aluminum alloy plate for serving to conduct heat are both required to be highly extensible and also capable of withstanding rolling and forming processings, which brings about another problem of giving more factors to limit a range of material selection.

In recent years, recycling materials has been regarded as very important to effectively use industrial resources. In accordance with the clad method incorporating a roll forming process, the magnetic metal plate and the aluminum or aluminum alloy plate are clad to produce the composite plate which is subsequently punched to leave the same of predetermined shape and consequently produces a large volume of scraps formed of the composite material. Contrary to a recyclable single metal plate such as an aluminum or aluminum alloy plate, those scraps of the composite material are not recyclable, which increases a manufacturing cost of the composite metal plate. Furthermore, the clad method finds difficulties in manufacturing a composite metal plate incorporating a magnetic metal plate exclusively in a portion required for heat generation.

SUMMARY OF THE INVENTION

The present invention is directed toward solving the above-described problems and has as one object thereof to provide a metal plate for electromagnetic heating which exhibits suitable heat generating characteristics and good forming quality.

It is another object of the present invention to provide a method of manufacturing a metal plate for electromagnetic heating which enables a selection range of magnetic materials to widen and is capable of reducing a manufacturing cost.

In accordance with the present invention, there is provided a metal plate for electromagnetic heating which comprises a substrate comprising aluminum or aluminum alloys, an intermediate layer formed on at least a portion of one surface of the substrate and comprising zinc or zinc alloys, and a conductive layer formed on the intermediate layer. The conductive layer serves as a heat generating body when eddy current induced by high-frequency magnetic flux flows through the conductive layer.

In order for the conductive layer to effectively generate heat, it is preferable that a thickness of the conductive layer is greater than a skin depth determined by a frequency of the eddy current and material of the conductive layer. When consideration is given to manufacturing costs and heat generating characteristics of various conductive materials, the conductive layer preferably comprises a single or plural layers which comprises at least one material selected from the group consisting of nickel, nickel alloys, iron, iron alloys, cobalt, and cobalt alloys. The heat generating characteristics of material slightly varies with a frequecy of the eddy current and a skin resistance of the material. To obtain an increased skin resistance, the conductive layer may comprise a single or plural layers which comprises at least one material selected from the group consisting of nickel, nickel alloys, iron and iron alloys. At least one element selected from the group consisting of P, C and B is dispersed in the single or plural layers to form alloys such as Ni—P, Ni—B, Ni—C, Fe—C and Fe—B.

The application of the present metal plate for electromagnetic heating to such corrosion resistant articles as rice cookers requires that the electric conductive layer be corrosion resistant. To this end, it is preferable to further provide an outer surface of the conductive layer with a corrosion resistant metal layer such as a chromium plating, a chromate coating or a zinc plating. Also, there may be coated with fluororesin or heat resistant organic resin of aramide, amide or imide type. In particular, when the conducting layer comprises nickel, nickel alloy, iron or iron alloy, it is preferable to provide thereon a multilayer coating containing chromium metal and chromium oxide as a corrosion resistant metal layer. The substrate comprising aluminum or aluminum alloys may be preferably coated on its surface, opposite the conductive layer, with fluororesin to prevent, among others, sticking of cooked rice or fried food thereto.

The present ivention further provides a method of manufacturing a metal plate for electromagnetic heating which comprises a step of providing by means of zincate treatment an intermediate layer comprising zinc or zinc alloys on at least a portion of one surface of a substrate comprising aluminum or aluminum alloys. The method further comprises a step of providing by an electrochemical transfer from a solution containing metal ions a conductive layer on the intermediate layer. The conductive layer serves as a heat generating body when eddy current induced by high-frequency magnetic flux flows therethrough. The term "electrochemical transfer" as use herein may be referred to as including electroplating, chemical plating and electroless plating, and means depositing metal by reducing its ions in a solution. To promote adhesion of an electroplated or chemically plated coating onto aluminum or aluminum alloys, an intermediate zinc or zinc alloy layer is precoated in a substrate portion to which the conductive layer is desired to be provided.

The present invention further provides a method of manufacturing a metallic mold for electromagnetic heating which comprises a step of subjecting aluminum or aluminum alloy material to press forming, and/or punching and cutting processes to mold a substrate and a step of providing by means of zincate treatment an intermediate layer comprising zinc or zinc alloys on at least a portion of one surface of the molded substrate. The method further comprises a step of providing by an electrochemical transfer from a solution containing metal ions a conductive layer on the intermediate layer. The conductive layer serves as a heat generating body when eddy current induced by high-frequency magnetic flux flows therethrough. In such a method, it is preferable to provide the conductive layer on a required portion of one surface of the molded substrate.

From a viewpoint of processibility, a metallic mold for electromagnetic heating may be obtained after a metal plate for electromagnetic heating has been manufactured. Accordingly, the present invention further provides a method of manufacturing a metallic mold for electromagnetic heating which comprises the steps of providing by means of zincate treatment an intermediate layer comprising zinc or zinc alloys on at least a portion of one surface of a substrate comprising aluminum or aluminum alloys, and providing by an electrochemical transfer from a solution containing metal ions a conductive layer on the intermediate layer to manufacture a metal plate for electromagnetic heating. The conductive layer serves as a heat generating body when eddy current induced by high-frequency magnetic flux flows therethrough. The method further comprises a step of subjecting the manufactured metal plate to press forming, and/or punching and cutting processes to mold the metal plate.

Preferably, a step may be further added which provides by an electrochemical transfer from a sulfuric acid solution containing chromium ions a corrosion resistant metal layer comprising a multilayer coating containing chromium metal and chromium oxides. The term "electrochemical transfer" as used herein may be referred to as including electroplating, chemical plating and electroless plating, as described above.

Numerous other features and advantages of the present invention will become readily apparent from the following detailed description of the invention and embodiments thereof, from the claims, and from the accompanying drawings.

DETAILED DESCRIPTION OF THE PREFERRED EMBODIMENTS

Figure 1:
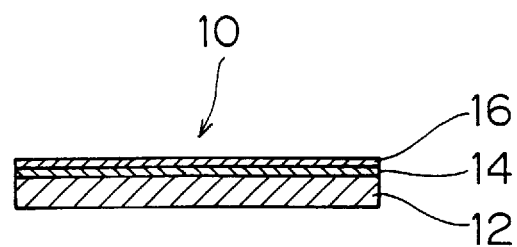
FIG. 1 is a cross-sectional view illustrating a construction of one embodiment of a metal plate for electromagnetic heating in accordance with the present invention.

A conductive layer as used in embodiments of the present invention includes a conductive metal layer formed by an electrochemical transfer from a solution containing metal ions. Metal species constituting the conductive layer can be selected from various metal elements. However, they need to be capable of serving as a heat generating body to generate heat when eddy current induced by an applied high frequency magnetic flux flows therethrough. In accordance with such a high-frequency heating method, when a conductor is placed in an alternating magnetic field with oscillation at a typical frequency of 20 kHz, eddy currents are caused to flow therein. The conductor consequently generates heat due to Joule's heat of the eddy currents. Accordingly, limitations are imposed to material dimensions including a thickness of the material when desired to heat the material efficiently. This is due to a significant influence of a skin effect which is produced when a high-frequency current flows through a conductor such as a metal.

TABLE 1 shows specific resistances and penetration depths of various metal plates, and their skin resistances given by specific resistance/penetration depth, as measured when they are heated by electromagnetical induction at a high-frequency of 20 kHz.

Whether each material is suitable as a load for electromagnetic cooking utensils is determined by a value of its skin resistance at the above operational frequency. For example, such material as aluminum of extremely low skin resistance does not generate a sufficient amount of heat as an output if eddy current is produced. A stainless steel of SUS 430 type is exclusively employed for a composite plate for electromagnetic heating which is manufactured by means of roll foming and is considered to be suitable for heat generation in terms of its skin resistance.

TABLE 1

| Material | Characteristic resistance ($\times 10^{-6}$ Ω cm) | Penetration thickness (mm) | Skin resistance ($\times 10^{-4}$ Ω cm) |
| --- | --- | --- | --- |
| Fe | 9.71 | 0.11 | 8.82 |
| Ti | 47 | 2.63 | 1.79 |
| Cu | 1.67 | 0.47 | 0.35 |
| Ni | 7.63 | 0.10 | 7.63 |
| Al | 2.6548 | 0.56 | 0.47 |
| SUS430 | 60 | 0.28 | 21.4 |
| SUS304 | 72 | 0.40 | 5.14 |
| 78 permalloy | 16 | 0.04 | 40.0 |

Although the present invention is not intended to limit the conductive layer to comprises the metal species as disclosed in TABLE 1, the conductive layer may be preferably selected to comprise material, including nickel alloys and iron alloys, which is alloyed to have increased specific and skin resistances.

A conductive layer serves as a heat generating body when eddy current induced by an applied magnetic flux flows through the layer, as described above. In order for such a conductive layer to effectively consume an alternating period produced by a high-frequency magnetic flux to generate heat, a thickness of the conductive layer is preferably made greater than a depth of a skin effect, i.e., a skin depth which is determined by a frequency of eddy current and properties of a conductive layer material. The skin depth is a thickness at which the eddy current flowing near a surface of the conductive layer falls to 1/e, and is accordingly a thickness required for the eddy current to attenuate by about 63%. However, the conductive layer having such a thickness consumes only approximately 80% of a supplied power. The conductive layer having an increased thickness is capable of consuming 95% of the supplied power.

Alternatively, the thickness of the conductive layer may be reduced to increase the skin resistance thereof, without having to rely upon a material selection as described above. In such a case, a large portion of the supplied power however passes through the thin conductive layer and makes no contribution to heat generation of the layer so that an overall amount of heat generated by the layer becomes small, while a heat generating density per unit thickness of the layer goes higher. An effective measure for utilizing the increase in skin resistance of a conductive layer with its reduced thickness may be to provide a conductive layer of multilayer construction which comprises a plurality of thin layers punctuated by an insulated layer, or a plurality of thin metal layers with adjacent ones of the thin metal layers comprising dissimilar metals. Even in the case such a measure is taken, a whole thickness of the conductive layer is preferably made greater than an overall skin depth of the conductive layer.

TABLE 2

| Material | Penetration depth (mm) | 95% Attenuation depth (mm) |
|---|---|---|
| Fe | 0.11 | 0.19 |
| Ti | 2.63 | 4.33 |
| Cu | 0.47 | 0.78 |
| Ni | 0.10 | 0.17 |
| Al | 0.56 | 2.09 |
| SUS430 | 0.28 | 0.38 |

As one of measures to increase the skin resistance of the material itself, nickel, nickel alloys including nickel-chromium alloy, iron, or iron alloys including permalloy and stainless steel, may be used for the material constituting the conductive layer. The addition of phosphorous, carbon or boron to the metal layer serves to increase skin resistance of the layer while maintaining original magnetic characteristics of the metal itself, and is very effective in embodying the present invention. In the event the conductive layer is formed by electroplating or chemical plating, the addition of phosphate compounds, carboxylate compounds and boron compounds including amino borane to metal plating baths respectively produces phosphorous eutectic deposits such as Ni—P and Fe—P deposits, carbon eutectice deposits such as Ni—C and Fe—C deposits, and boron eutectic deposits such as Ni—B and Fe—B deposits.

A surface of aluminum or aluminum alloy is normally covered with a layer primarily comprising an aluminum oxide. It therefore becomes necessary to reveal its fresh surface to provide a better adhesion thereof to a coating layer to be disposed thereon. One method for revealing the fresh surface involves electron or ion impact in a vacuum chamber. When the electroplating or chemical plating is employed to provide a metal deposit on aluminum, zincate treatment may be suitably used as a means for depositing metal of different type while dissolving the aluminum surface. In the zincate treatment, zinc alone may be deposited on aluminum while zinc alloys containining iron, nickel or cobalt may be preferably deposited on aluminum alloys in order to provide an effective and increased adheshion therebetween.

A conductive layer comprising nickel, nickel alloys, iron or iron alloys may be preferably coated on its surface with a corrosion resistant metal layer to prevent corrosion or discoloration of the conductive layer.

Since the present invention finds one of its applications in an electromagnetic cooking pan, the corrosion resistant metal layer needs to be sufficiently sanitary to be used in contact with food. It is accordingly preferable to provide a corrosion resistant metallic coating of multilayer construction which contains chromium metal and chromium oxides. Such a coating can be formed by an electrochemical transfer, including electroplating, chemical plating, electroless plating and the others, from a dilute solution of sulfuric acid containing chromium ions. For example, an electrolytic bath containing chromium ions in a dilute solution of sulfuric acid can be employed to electroplate a coating of multilayer construction having two or more layers and including a hydrated chromium oxide layer on a chromium metal layer, although the multilayer construction slightly varies with selected electroplating conditions. This coating contains sulfate ions as impurities. However, a small amount of fluorine ions can be added to the electrolytic bath to slightly improve the corrosion resistant characteristics of the coating to be plated.

In order to assure that magnetic fluxes flow though the coating and reach the underneath conductive layer to a sufficient extent, the thickness of the coating may be preferably made 1 $\mu$m or less.

Thus, there has been disclosed a conductive layer whose generating heat property can be appropriated by adjusting a metallic material and additives. A plating procedure enables an increased accuracy of a thickness of the conductive layer, and also facilitates forming process by providing the conductive layer only on a required portion of an aluminum or aluminum alloy plate which has been molded into a desired shape. Moreover, the metal plate or the metallic mold in accordance with the present invention can be manufactured at a low cost since a marerial loss is reduced and the operating process is electroplating or electroless plating.

EXAMPLES

Example 1

Selected as a substrate was a JIS 3004 type aluminum alloy plate available under the trade designation MG-110 (Mg content: 0.6≈0.8%; Mn content: 0.9≈1.1%; Size: a circular plate having a thickness of 1.5 mm and a diameter of 425 mm) from Sumitomo Light Metal Ind. The aluminum alloy plate was treated in a 120 g/l aqueous solution of sodium hydroxide maintained at 80° C.,and was subsequently immersed in a 50 g/l aqueous solution at 60° C. of an alkaline pickling agent available under the trade designation AZ 102 from Uyemura & Co., Ltd. After washed with water, the plate was treated in a mixture at room temperature of 100 g/l of an acidic smut-removing agent available under the trade desingation Desmuter AZ 201 from Uyemura & Co., Ltd. and 800 ml/l of nitric acid. Thereafter, a 0.1 $\mu$m zincate layer was formed on one surface of the plate using a zincate treatment and a zinc replacement solution available under the trade designation AZ 401 from Uyemura & Co., Ltd.

0.2 mol/l of phosphorous acid as a phosphorous source was added to a mixture consisting of 680 g/l of nickel sulfamate tetrahydrate, 20 g/l of nickel chloride hexahydrate and 40 g/l of boric acid to prepare a nickel plating bath. The aluminum alloy plate was treated in the nickel plating bath under the plating condition of a bath temperature of 70° C. and a cathode current density of 80 A/dm$^2$ to obtain a Ni—7% P coating (specific resistance of 59 $\mu\Omega$) of approximately 100 $\mu$m on the zincate layer.

FIG. 1 is a cross-sectional view illustrating a construction of a metal plate for electromagnetic heating manufactured in accordance with the above procedure.

Referring to FIG. 1, a metal plate 10 comprises a substrate 12 comprising alluminum alloy,a zincate layer 14 formed on one surface of the substrate 12 and a conductive layer 16 formed on the zincate layer 14.

The metal plate 10 of such a construction for electromagnetic heating was then subjected to molding process to produce a metallic mold 18 for electromagnetic heating.

Figure 2:
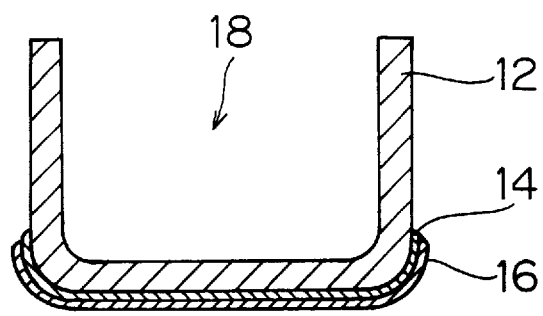
FIG. 2 is a cross-sectional view illustrating a construction of one embodiment of a metallic mold for electromagnetic heating in accordance with the present invention.

FIG. 2 is a cross-sectional view illustrating a construction of the thus formed metallic mold 18 for electromagnetic heating. This metallic mold 18 for electromagnetic heating was used with an IH cooking utensil available under the trade designation KZP 1 from Matsushita Electric Ind. to observe heat generating characteristics thereof. For a comparative example, a SUS 430 type stainless steel of 0.5 mm thick and the above-employed aluminum alloy plate were subjected to roll forming and thereafter to molding to manufacture a metallic mold for electromagnetic heating. Results show that while a surface temperature of the metallic mold of the comparative example reached 200° C. in about 40 seconds, that of the metallic mold of EXAPLE 1 reached 200° C. in less than 30 seconds.

EXAMPLE 2

Selected as a substrate was a JIS 3004 type aluminum alloy plate available under the trade designation MG-110 (Mg content: 0.6≈0.8%; Mn content: 0.9≈1.1%; Size: a circular plate having a thickness of 1.5 mm and a diameter of 425 mm) from Sumitomo Light Metal Ind. The aluminum alloy plate was immersed in an aqueous solution of sodium hydroxide and subjected to electrolytic etching at an electric quality of 20 coulomb/cm$^2$ to provide small irregularities on one surface of the plate. A dispersed fluororesin solution was coated on the surface with small irregularities and was thereafter baked. The plate coated with fluororesin was processed by a hydraulic press into a bowl shape with a depth of 146 mm and a internal diameter of 221 mm for use within a rice cooker jar.

Only a bottom portion of an outer surface, opposite the surface coated with fluororesin, of the mold was treated in a 120 g/l aqueous solution of sodium hydroxide controlled at 80° C. and was subsequently immersed in a 50 g/l aqueous solution at 60° C of the alkaline pickling agent available under the trade designation AZ 102 from Uyemura & Co., Ltd. After washed with water, the plate was treated in a mixture at room temperature of 100 g/l of the acidic smut-removing agent available under the trade desingation Desmuter AZ 201 from Uyemura & Co., Ltd. and 800 ml/l of nitric acid. Thereafter, a 0.1 μm zincate-layer was formed on a bottom portion of an outer surface of the mold using a zincate treatment and the zinc replacement solution available under the trade designation AZ 401 from Uyemura & Co., Ltd.

480 g/l of nickel sulfamate tetrahydrate, 25 g/l of iron sulfate heptahydrate, 30 g/l of boric acid, 5 g/l of NH$_2$OH·HCl, 1 g/l of sodium saccharate, 0.1 g/l of sodium lauryl sulfate and 15 g/l of NH$_2$SO$_3$H were mixed to prepare a Fe—Ni plating bath. The bottom portion of the mold was treated in the Fe—Ni plating bath under the plating conditions of a bath temperature of 45° C. and a cathode current density of 25 A/dm$^2$ to obtain a Ni—20% Fe coating (permalloy) of approximately 50 μm on the zincate layer provided on on a bottom portion of an outer surface of the mold.

Figure 3:
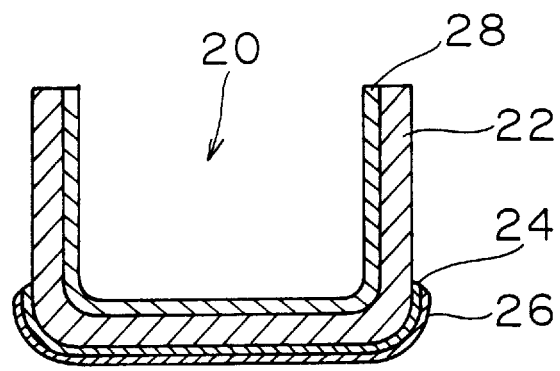
FIG. 3 is a cross-sectional view illustrating a construction of another embodiment of a metallic mold for electromagnetic heating in accordance with the present invention.

FIG. 3 is a cross-sectional view illustrating a construction of the thus formed metallic mold 20 for electromagnetic heating.

Referring to FIG. 3, a metallic mold 20 comprises a substrate 22 comprising alluminum alloy, a zincate layer 24 formed on a portion of one surface of the substrate 22, a conductive layer 26 formed on the zincate layer 24 and a fluororesin coating 28 formed on the other surface of the substrate 22. To prevent corrosion, particularly corrosion in gaps, a silicon resin was spray coated over a whole plated surface and over boundary surfaces formed between the plated and non-plated surfaces.

This metallic mold 20 for electromagnetic heating was used with an IH cooking utensil available under the trade designation KZP 1 from Matsushita Electric Ind. to observe heat generating characteristics thereof. For a comparative example, a SUS 430 type stainless steel of 0.5 mm thick and the above-employed aluminum alloy plate were subjected to roll forming and thereafter to molding to manufacture a metallic mold for electromagnetic heating. Results show that while a surface temperature of the metallic mold of the comparative example reached 200° C. in about 40 seconds, that of the metallic mold of EXAMPLE 2 reached 200° C. in less than 40 seconds.

EXAMPLE 3

Selected as a substrate was a JIS 3004 type aluminum alloy plate available under the trade designation MG-110 (Mg content: 0.6≈0.8%; Mn content: 0.9≈1.1%; Size: a circular plate having a thickness of 1.5 mm and a diameter of 425 mm) from Sumitomo Light Metal Ind. The aluminum alloy plate was treated in a 120 g/l aqueous solution of sodium hydroxide maintained at 80° C., and was subsequently immersed in a 50 g/l aqueous solution at 60° C. of the alkaline pickling agent available under the trade designation AZ 102 from Uyemura & Co., Ltd. After washed with water,the plate was treated in a mixture at room temperature of 100 g/l of the acidic smut-removing agent available under the trade desingation Desmuter AZ 201 from Uyemura & Co., Ltd. and 800 ml/l of nitric acid. Thereafter, a 0.1 μm zincate layer was formed on one surface of the plate using a zincate treatment and the zinc replacement solution available under the trade designation AZ 401 from Uyemura & Co., Ltd.

0.2 mol/l of phosphorous acid as a phosphorous source was added to a mixture consisting of 680 g/l of nickel sulfamate tetrahydrate, 20 g/l of nickel chloride hexahydrate and 40 g/l of boric acid to prepare a nickel plating bath. The aluminum alloy plate was treated in the nickel plating bath under the plating condition of a bath temperature of 70° C. and a cathode current density of 80 A/dm$^2$ to obtain a Ni—7% P coating (specific resistance of 59 μΩ) of approximately 50 μm on the zincate layer. Furthermore, the aluminum alloy plate coated with such coatings was immersed in an aqueous solution of 40 g/l anhydrous chromic acid and 45 g/l of sulfuric acid as an electrolytic solution to plate a corrosion resistant metal layer under the plating conditions of a current density of 5 A/dm$^2$ and a plating period of 10 minutes.

The metal plate of such a construction for electromagnetic heating was then subjected to molding process to produce a metallic mold for electromagnetic heating.

Figure 4:
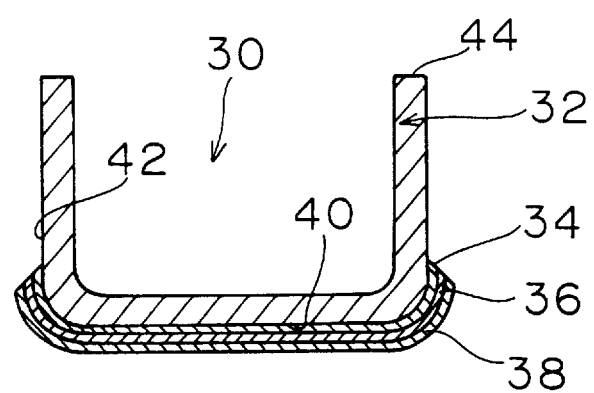
FIG. 4 is a cross-sectional view illustrating a construction of still another embodiment of a metallic mold for electromagnetic heating in accordance with the present invention.

FIG. 4 is a cross-sectional view illustrating a construction of the thus formed metallic mold for electromagnetic heating.

Referring to FIG. 4, this metallic mold 30 comprises a substrate 32 comprising aluminum alloy, a zincate layer 34 formed on a portion of one surface of the substrate 32, a conductive layer 36 formed on the zincate layer 34 and a corrosion resistant metal layer 38 formed on the other surface of the substrate 32. More specifically, the-substrate 32 is shaped to have a generally U-shaped cross-section for defining an outwardly directed bottom surface 40 and a side wall surface 42 extending upwardly from the bottom surface 40 to a distal end 44 of the substrate 32. The zincate layer 34 may be provided on a selected discrete area of a back surface of the substrate 32 including the bottom surface 40 of the substrate 32. In the illustrated embodiment, the zincate layer 34 is provided to extend upwardly from the bottom surface 40 onto the side wall surface 42 but to stop short of the distal end 44 of the substrate 32.

This metallic mold 30 for electromagnetic heating was used with an IH cooking utensil available under the trade designation KZP 1 from Matsushita Electric Ind. to observe heat generating characteristics thereof. Results showed that a surface temperature of the metallic mold of EXAMPLE 3 reached 200° C. in less-than 40 seconds, which was a satisfactory result.

The corrosion resistant properties of the metallic molds were also evaluated in accordance with the salt spray test of JIS-z-2371. Results showed that for a sample which was not subjected to plating in an aqueous solution of 40 g/l anhydrous chromic acid and 45 g/l of sulfuric acid and had an exposed conductive layer, some color change of the conductive layer to a brown color was recognized after 50 short hours of treatment, while for a sample in accordance with EXAMPLE 3, no corrosion was recognized even after 1000 hours of treatment.

It should be understood that the metallic mold 30 of EXAMPLE 3 may further comprise such a fluororesin coating as shown in FIG. 3 for EXAMPLE 2.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A metal plate for electromagnetic heating comprising:
    a substrate comprising aluminum or aluminum alloys;
    an intermediate layer formed on at least a portion of one surface of said substrate and comprising zinc or zinc alloys; and
    a conductive layer formed on said intermediate layer for serving as a heat generating body when eddy current induced by high-frequency magnetic flux flows therethrough;
    wherein said conductive layer comprises a single or plural layers which comprises at least one material selected from the group consisting of nickel alloys, and nickel-cobalt alloys.

2. A metal plate in accordance with claim 1, wherein a thickness of said conductive layer is greater than a skin depth determined by a frequency of said eddy current and material of said conductive layer.

3. A metal plate in accordance with claim 1, wherein said conductive layer further comprises at least one element selected from the group consisting of P, C and B is dispersed in said single or plural layers.

4. A metal plate in accordance with claim 1, further comprising a corrosion resistant metal layer formed on said conductive layer.

5. A metal plate in accordance with claim 4, wherein said corrosion resistant metal layer comprises a multilayer coating containing chromium metal and chromium oxides.

6. A metal plate in accordance with claim 1, wherein the other surface of the substrate is coated with fluororesin.

7. A metal plate in accordance with claim 1, wherein a thickness of said conductive layer is no greater than about 100 $\mu$m.

8. A metal plate for electromagnetic heating comprising:
    a heat conductive aluminum or aluminum alloy substrate having on its one surface a selected discrete area for receiving heat;
    an intermediate zinc or zinc alloy layer plated on the selected discrete area of the substrate; and
    a conductive metal layer plated on the intermediate layer for generating heat by means of eddy current induced therein by an externally applied magnetic flux,
    wherein sat conductive metal layer comprises a single or plural layers which comprises at least one material selected from the group consisting of nickel alloys, and nickel-cobalt alloys.

9. A metal plate in accordance with claim 8, wherein said heat conductive substrate is shaped to have a generally U-shaped cross-section for defining an outwardly directed bottom surface and a side wall surface extending upwardly from the bottom surface to a distal end of the substrate, said selected discrete area including the bottom surface of the substrate.

10. A metal plate in accordance with claim 9, wherein said selected discrete area extends upwardly from the bottom surface onto the side wall surface but stops short of the distal end of the substrate.

11. A metal plate in accordance with claim 8, wherein said conductive layer is formed of a plurality of thin metal layers so that adjacent ones of said thin metal layers comprise dissimilar metals.

12. A metal plate in accordance with claim 8, wherein a thickness of said conductive metal layer is in the range of 80%≈95% power attenuation depth determined by a frequency of the eddy current and material property of the conductive metal layer.

13. A metal plate in accordance with claim 8, wherein said thickness of said conductive metal layer is no greater than about 100 $\mu$m.

* * * * *